June 24, 1941.  R. M. BUFFINGTON  2,246,665
REFRIGERATION
Filed Nov. 8, 1938  2 Sheets-Sheet 2
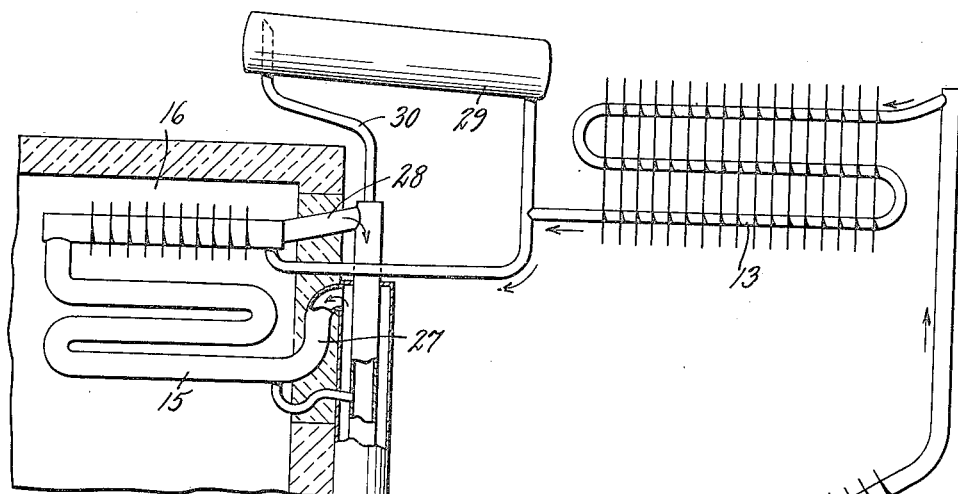
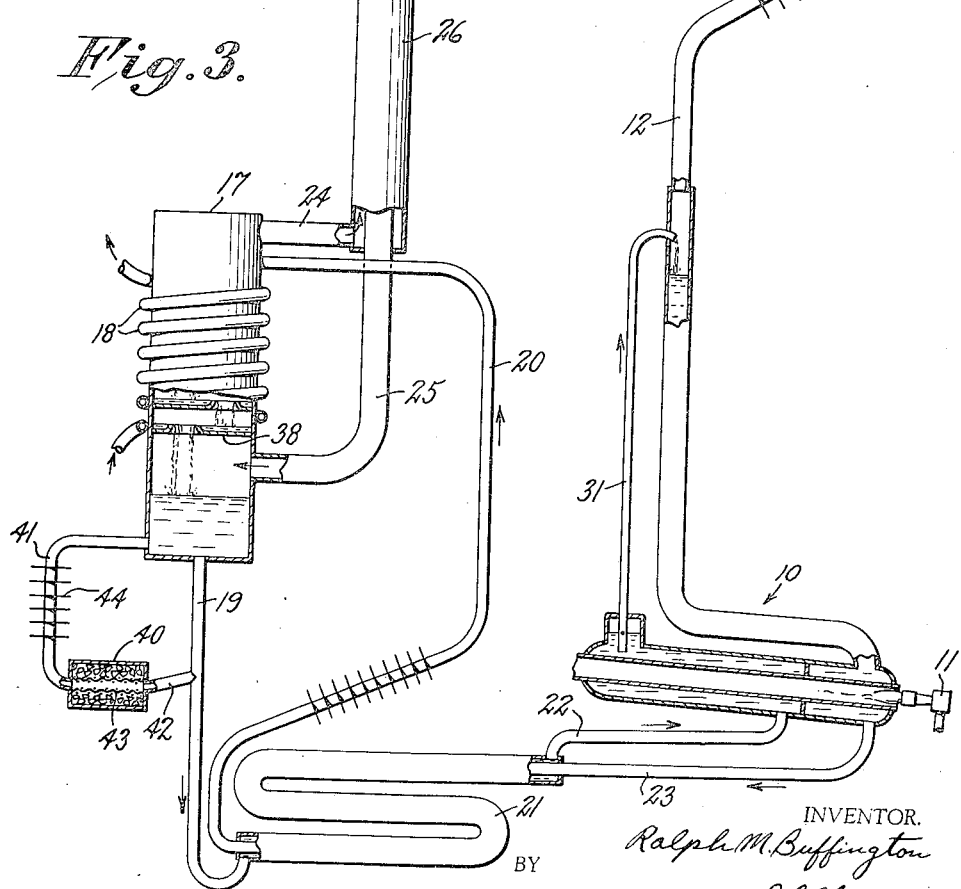
Fig. 3.
INVENTOR.
Ralph M. Buffington
BY
ATTORNEY.

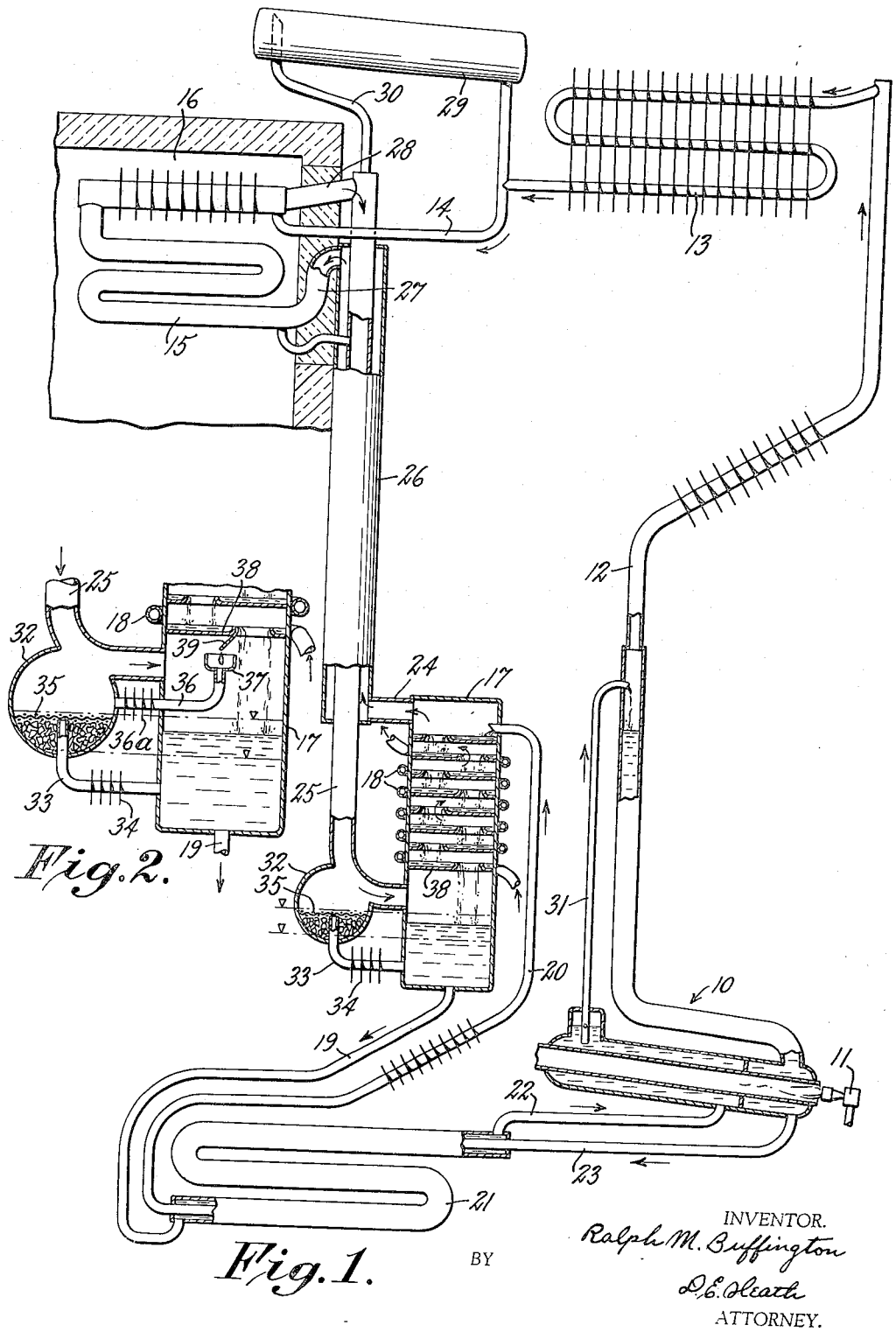

Patented June 24, 1941

2,246,665

UNITED STATES PATENT OFFICE 2,246,665

REFRIGERATION

Ralph M. Buffington, Evansville, Ind., assignor to Servel, Inc., New York, N. Y., a corporation of Delaware Application November 8, 1938, Serial No. 239,439

17 Claims. (Cl. 62—179)

My invention relates to refrigeration, more particularly to hermetically sealed refrigeration systems, and still more particularly to absorption type refrigeration systems containing auxiliary pressure equalizing fluid.

It is an object of the present invention to inhibit corrosion of the metal parts of such refrigeration systems, directly or indirectly, due to the presence of the fluids therein by the novel method and means hereinafter described in connection with the accompanying drawings forming part of this specification and of which Fig. 1 shows more or less diagrammatically a refrigeration system embodying the invention; Fig. 2 is a detail sectional view of a part of the system shown in Fig. 1 and illustrating a modification; and Fig. 3 is a view like Fig. 1 showing a refrigeration system embodying a further modification of the invention.

In Fig. 1, a generator 10 is heated by a burner 11. The generator 10 is connected by a conduit 12 to one end of an air cooled condenser 13. The other end of condenser 13 is connected by a conduit 14 to the upper part of an evaporator 15 located in a refrigerator storage compartment 16.

An absorber 17 is air cooled as, for instance, by heat transfer from the absorber to the air by means of a vaporization-condensation circuit including an air cooled condenser, not shown, and a vaporizing coil 18 arranged in heat transfer relation with the absorber 17. The absorber 17 is connected by conduits 19 and 20, liquid heat exchanger 21, and conduits 22 and 23 to the generator 10.

The absorber 17 is connected by conduits 24 and 25, a gas heat exchanger 26, and conduits 27 and 28 to the evaporator 15. The outlet end of condenser 13 is connected by conduit 14, vessel 29, and conduit 30 to the gas heat exchanger 26.

A system like that so far described is formed of steel vessels and pipes welded together to form a fluid tight system having all parts in open fluid communication with each other. The system is evacuated, charged with a water solution of ammonia and hydrogen gas under pressure, and hermetically sealed. The fluids may be introduced by way of a charging connection, not shown, in the absorber 17. The liquid fills the lower part of the apparatus to its own level. The upper part of the apparatus contains gas and vapor in equilibrium with vapors from the liquid.

In operation, the generator 10 is heated by burner 11. The condenser 13 and absorber 17 are cooled by heat transfer to air. Ammonia vapor is expelled from solution in the generator 10. Vapor passes from the generator to condenser 13 through conduit 12. Ammonia vapor is condensed to liquid in condenser 13. Liquid ammonia flows from condenser 13 through conduit 14 into evaporator 15. Liquid ammonia evaporates and diffuses into hydrogen in evaporator 15, producing a refrigerating effect for cooling compartment 16.

The mixture of gas and vapor flows from evaporator 15 through conduit 28, gas heat exchanger 26, and conduit 25 into absorber 17. Weakened absorption liquid flows from generator 10 through conduit 23, liquid heat exchanger 21, and conduit 20 into absorber 17. Ammonia vapor is absorbed into solution in absorber 17. Weak gas flows from the absorber 17 through conduit 24, gas heat exchanger 26, and conduit 27 back to evaporator 15. Enriched absorption liquid accumulates in the lower part of absorber 17 and flows through conduit 19, liquid heat exchanger 21, and conduit 22 back to generator 10.

The above described circulation of gas in the evaporator-absorber circuit is due to the difference in specific weights of the weak gas in the column in the path of flow from the absorber to the evaporator and the rich gas in the column in the path of flow from the evaporator to the absorber. The above described circulation of liquid in the generator-absorber circuit is carried out by known vapor lift action in generator conduit 31 whereby liquid in the generator is lifted from a lower to a higher level by expelled vapors so that liquid flows through the absorber by gravity.

It is known to place a small quantity of corrosion inhibiting substance in the system at the time of charging. One class of substance which has been found suitable for the purpose of inhibiting corrosion is that containing chromium, as for example, potassium or sodium chromate or bichromate. The corrosion inhibiting substance is most effective when carried in solution by the absorption liquid, because the purpose is to prevent corrosion in the generator-absorber circuit and the resultant deposition of magnetic iron oxide. The concentration of chromate necessary to prevent corrosion is not large—certainly less than .05% $CrO_3/H_2O$ equivalent in the case of an alkali chromate. It is known to use an initial charge containing sodium chromate equivalent to as much as 1.6% to 2.0% $CrO_3/H_2O$ in solution. This initial concentration decreases with time as the unit is operated. The amount of chromate in a system may last a few years or it may last many years. It is impractical to increase the initial chromate content of the solution to any great extent. High chromate content reduces the solubility of ammonia and thus interferes with the operation of the system. It is also necessary to avoid the possibility of precipitation of solid chromate at points which might block fluid circulation. It is therefore desirable to provide a reserve supply of solid chromate and cause it to enter the solution as needed. It is known to provide a reserve supply of solid chromate and a slow process, such as diffusion, to regulate the rate of chromate input into solution. This is disclosed in United States Patent No. 1,960,040 of Nils Widell, granted May 22, 1934.

In accordance with this invention I provide a reserve quantity of solid chromate and an equilibrium process for controlling the concentration of chromate in solution in the generator-absorber circuit. The solid chromate may be in the form of, for instance, potassium or lithium or sodium chromate. The reserve is placed at a point of minimum solubility and the temperature and partial pressure of ammonia present controlled to make this solubility low. The embodiments herein employ potassium chromate. Referring again to Fig. 1, a vessel 32 is in open communication with conduit 25 so that the upper part of vessel 32 is filled with strong or rich gas flowing toward the absorber 17. The lower part of vessel 32 is connected by a conduit 33 to the lower part of absorber 17. Conduit 33 projects upward into the lower part of vessel 32. Conduit 33 is provided with heat transfer fins 34 for cooling this conduit. Around the upward extending end of conduit 33 in vessel 32 is placed solid potassium chromate ($K_2CrO_4$). Over the solid chromate and the open end of conduit 33 is secured a screen 35 or other suitable grille to prevent displacement of the chromate as when the apparatus is turned upside down. The strong or rich solution accumulated in the lower part of absorber 17 floods the lower part of vessel 32, which may be referred to as a saturator. The small quantity of liquid in saturator 32 envelops the the solid chromate in this vessel. Solubility of $K_2CrO_4$ in aqua ammonia decreases with increasing ammonia content, and becomes very small in pure liquid ammonia. The solubility increases rather slowly with increasing temperature. The solubility of ammonia, at a given partial pressure, decreases with increasing temperature. Therefore, the solubility of $K_2CrO_4$ in aqua ammonia saturated at a given partial pressure of ammonia decreases with decreasing temperature.

The saturator 32 is at a temperature below that of the absorber 17. This is because the rich gas entering vessel 32 from conduit 25 comes from the evaporator 15 through gas heat exchanger 26 and is at a lower temperature than that which it reaches in the absorber 17, and also due to the fact that strong solution from absorber 17 is cooled in conduit 33 and in vessel 32 both of which are outside of the zone in which substantial amounts of heat are produced by absorption. In saturator 32, the aqua ammonia is in equilibrium with the rich gas from the evaporator at temperatures between that of the room and the absorber. These conditions should be such that concentrations under .35% $Cr/H_2O$ are obtained. These concentrations are high enough to prevent corrosion, and low enough not to interfere with operation of the system.

In operation of the system, the liquid level rises and falls in the lower part of absorber 17. When the liquid level rises, solution flows from the absorber into the saturator 32. When the liquid level falls, solution flows back into the absorber. During the time that a particular quantity of solution stays in the saturator 32, it is exposed to rich gas and to solid chromate, and tends to become saturated with respect to ammonia at the partial pressure of ammonia in the rich gas at the temperature of the saturator, and with respect to chromate at the saturation concentration of ammonia and at the temperature of the saturator.

Conditions of partial pressure and temperature in saturator 32 will vary from time to time so that the saturation value of % $CrO_3/H_2O$ will change correspondingly. When the solubility increases, chromate will dissolve in the saturator. When the solubility decreases, chromate will be abstracted from solution and crystallized out in the saturator.

The fluctuating liquid level by carrying solution back and forth between saturator 32 and absorber 17 tends to impress the % of $CrO_3/H_2O$ existing in the saturator at the time, upon the whole body of solution in the generator-absorber circuit. The % $CrO_3/H_2O$ in the main body of solution being set by the saturator conditions of partial pressure and temperature at a lower value than corresponds to saturation at any point in the main generator-absorber circuit, precipitation cannot occur anywhere in the main circuit. This avoids getting too much chromate into solution without the possibility of getting too little. The difference in solubility is due to the higher temperature and lower concentration of ammonia throughout the generator-absorber solution circuit.

In Fig. 2 there is illustrated a part of the system shown in Fig. 1 including the lower part of absorber 17, saturator 32, and the connections therebetween. In this modification there is made provision for positive small flow of strong solution through saturator 32 irrespective of rise and fall of liquid level. Above the chromate in saturator 32 there is connected to this vessel one end of a conduit 36. The other end of conduit 36 is turned upward in absorber 17 and the upper end is provided with a bell mouth 37. From the lower absorber plate 38 there depends a lip 39 for directing drippage of some of the strong solution overflowing plate 38 into conduit 36. The solution flows through conduit 36, through saturator 32 and conduit 33 back into the lower part of the absorber 17. Otherwise, the saturator 32 functions in the same manner as that described in connection with Fig. 1.

In Fig. 3 there is shown a refrigeration system like that described in connection with Fig. 1. Like parts are indicated by the same reference numerals in Figs. 1 and 3. Construction and operation is the same in both systems. Referring, however, to Fig. 3, a saturator 40 is completely submerged in strong or rich absorption liquid. One end of the saturator vessel 40 is connected by a conduit 41 to the lower part of absorber 17. The other end of vessel 40 is connected by a conduit 42 to conduit 19 below the bottom of absorber 17. A tubular screen 43 or other suitable grille forms a passage through vessel 40. The solid chromate fills vessel 40 around the screen 43. Conduit 41 is provided with heat transfer fins 44 for air cooling of this conduit. Conduit 41, saturator vessel 40, and conduit 42 are flooded with rich absorption liquid from absorber 17. Due to cooling of conduit 41 there is set up a circulation of liquid downward in conduit 41, through vessel 40, and through conduit 42 to conduit 19.

In this form, the saturator is submerged in liquid and there is not utilized further saturation of rich liquid as in the forms described in connection with Figs. 1 and 2. The ammonia content of liquid in the saturator is left unchanged. If potassium chromate is used in saturator 40, the chromate concentration maintained in the generator-absorber liquid circuit will be higher at the same saturator temperature than in the case of the saturators in Figs. 1 and 2. It is therefore desirable to cool saturator 40 to a lower temperature.

In any of the above described modifications, the fins for cooling the saturator liquid, such as fins 34 in Figs. 1 and 2, fins 36a in Fig. 2, and fins 44 in Fig. 3 are generally representative of cooling means. Instead of providing the fins, the respective conduits could be attached to a framework on which the apparatus is mounted. Any other cooling means may be used for maintaining the saturator at a lower temperature than the absorption liquid circuit during operation of the system so that the chromate solubility will always be less in the saturator during operation of the system.

Various other changes and modifications may be made within the scope of the invention which is not limited except as indicated in the following claims.

What is claimed is:

1. That improvement in inhibiting corrosion in an absorption refrigeration system containing liquid which consists in maintaining a reserve supply of solid corrosion inhibiting substance soluble in said liquid in a stream of liquid flowing to and from the active liquid containing portion of the system.

2. That improvement in inhibiting corrosion in an absorption refrigeration system containing liquid whch consists in maintaining a reserve supply of solid corrosion inhibiting substance soluble in said liquid in a stream of liquid flowing to and from the active liquid containing portion of the system, and maintaining said stream at a lower temperature than said active portion of the system.

3. That improvement in inhibiting corrosion in an absorption refrigeration system containing liquid whch consists in maintaining a supply of solid corrosion inhibiting substance soluble in said liquid in contact with the liquid in a place of liquid movement where the conditions during operation of the system are such that solubility of said substance in the liquid is least, and causing circulation in liquid phase of said liquid through said place.

4. In a method of refrigeration with the aid of a system containing liquid, that improvement which consists in inhibiting corrosion in said system by circulating in liquid phase said liquid in contact with a reserve supply of solid corrosion inhibiting substance soluble in said liquid at a place where solubility of said substance in the liquid is least during operation of the system.

5. A method of refrigeration as set forth in claim 4 in which said circulation of liquid is caused by thermosyphon action.

6. A method of refrigeration as set forth in claim 4 in which said circulation of liquid is caused by rise and fall of liquid in chambers communicating below the surface level of said liquid.

7. In a method of refrigeration which includes circulation of absorption liquid in an absorber-generator circuit and circulation of inert gas in an evaporator-absorber circuit, that improvement which consists in inhibiting corrosion due to said liquid by maintaining a reserve quantity of corrosion preventing substance soluble in said liquid, causing flow of enriched absorption liquid from said absorption liquid circuit to and from a place of saturation, flowing enriched inert gas from said gas circuit to and from said place of saturation so that the liquid and gas are in the presence of each other in said place, and maintaining said quantity of corrosion preventing substance in contact with liquid in said place of saturation.

8. In a method of refrigeration which includes circulation of absorption liquid in an absorber-generator circuit and circulation of inert gas in an evaporator-absorber circuit, that improvement which consists in inhibiting corrosion due to said liquid by maintaining a reserve quantity of corrosion preventing substance soluble in said liquid, causing flow of enriched absorption liquid from said absorption liquid circuit to and from a place of saturation, flowing enriched inert gas from said gas circuit to and from said place of saturation so that the liquid and gas are in the presence of each other in said place, maintaining said quantity of corrosion preventing substance in contact with liquid in said place of saturation, and maintaining said place of saturation at such a temperature condition with respect to the temperature conditions of said liquid circuit that the solubility of said corrosion preventing substance in said liquid is less in said place of saturation than in said liquid circuit.

9. In a refrigeration system having a circuit for liquid, means for preventing corrosion due to liquid in said circuit comprising a solid corrosion preventing substance soluble in said liquid, means for flowing in liquid phase liquid in said circuit into and out of contact with said solid substance, and means for maintaining liquid in contact with said substance at a lower temperature than in said circuit.

10. A refrigeration system including a circuit for liquid absorbent and a circuit for inert gas, means for inhibiting corrosion due to said liquid comprising a quantity of solid corrosion preventing substance, and means for conducting in liquid phase liquid to and from said liquid circuit in contact with said solid substance in the presence of gas in said gas circuit.

11. The combination with a refrigerating system containing liquid, of a vessel containing solid corrosion preventing material soluble in said liquid, means for maintaining said vessel at a lower temperature than other liquid containing parts of said system, and means for causing flow in liquid phase of liquid in said system to and from said vessel.

12. The combination as set forth in claim 11 in which said liquid flowing means operates by thermosyphon action.

13. The combination as set forth in claim 11 in which said liquid flowing means is gravity actuated.

14. In a method of refrigeration which includes evaporation of refrigerant fluid in the presence of inert gas, absorption of refrigerant fluid from the inert gas into a liquid solvent, and distillation of refrigerant fluid from the solvent, that improvement which consists in inhibiting corrosion due to said liquid solvent by maintaining a reserve quantity of corrosion preventing substance of which the solubility in the solution is inversely proportional to the concentration of refrigerant fluid in the solution in contact with solution at a place where the concentration of refrigerant fluid is the greatest, and causing circulation in liquid phase of solution through said place.

15. A method of refrigeration as set forth in claim 14 in which the liquid absorbent is water, the refrigerant fluid is ammonia, and the corrosion preventing substance is potassium chromate.

16. In a method of refrigeration which includes evaporation of refrigerant fluid in the presence of inert gas, absorption of refrigerant fluid from the gas into liquid solvent, and distillation of refrigerant fluid from the solvent, the solubility of the refrigerant fluid in the solvent being inversely proportional to temperature, that improvement which consists in inhibiting corrosion due to said liquid by maintaining a reserve quantity of corrosion preventing substance of which the solubility in the solution is inversely proportional to the concentration of refrigerant fluid in the solution in contact with solution in the presence of gas at a place where the temperature is lowest and therefore the concentration of refrigerant fluid in solution the highest, and causing circulation in liquid phase of solution through said place.

17. A refrigeration system including a generator, a condenser, an absorber, and containing refrigerant fluid, absorption liquid, and auxiliary pressure equalizing fluid, a corrosion inhibitor comprising a vessel containing a solid corrosion preventing substance soluble in said liquid and connected in said system so as to receive said auxiliary pressure equalizing fluid, conduits for conducting absorption liquid in liquid phase from said absorber to and from said vessel into contact with said solid substance and said auxiliary pressure equalizing fluid, and means for maintaining said vessel at a temperature lower than temperatures of said liquid in all other parts of the system.

RALPH M. BUFFINGTON.

CERTIFICATE OF CORRECTION.

Patent No. 2,246,665. June 24, 1941.

RALPH M. BUFFINGTON.

It is hereby certified that error appears in the printed specification of the above numbered patent requiring correction as follows: Page 2, first column, line 69, for "$Cr/H_2O$" read --$CrO_3/H_2O$--; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.